United States Patent
Geiss

(10) Patent No.: US 9,066,017 B2
(45) Date of Patent: Jun. 23, 2015

(54) VIEWFINDER DISPLAY BASED ON METERING IMAGES

(71) Applicant: Google Inc., Mountain View, CA (US)

(72) Inventor: Ryan Geiss, Mountain View, CA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 13/849,824

(22) Filed: Mar. 25, 2013

(65) Prior Publication Data

US 2014/0285698 A1    Sep. 25, 2014

(51) Int. Cl.
*H04N 5/232* (2006.01)
*H04N 5/235* (2006.01)
*H04N 5/228* (2006.01)

(52) U.S. Cl.
CPC ......... *H04N 5/23293* (2013.01); *H04N 5/2355* (2013.01); *H04N 5/2356* (2013.01)

(58) Field of Classification Search
CPC ... H04N 5/23293; H04N 5/232; H04N 5/235; H04N 5/228; H04N 5/262
USPC .............. 348/333.05, 221.1, 362–369, 229.1, 348/341, 222.1, 427, 296, 239, 333.01
See application file for complete search history.

(56) References Cited

U.S. PATENT DOCUMENTS

| | | | |
|---|---|---|---|
| 4,644,582 A | 2/1987 | Morishita et al. | |
| 5,781,308 A | 7/1998 | Fujii et al. | |
| 5,828,793 A | 10/1998 | Mann | |
| 5,926,190 A | 7/1999 | Turkowski et al. | |
| 6,061,091 A | 5/2000 | Van de Poel et al. | |
| 6,075,905 A | 6/2000 | Herman et al. | |
| 6,101,285 A | 8/2000 | Fan | |
| 6,204,881 B1 | 3/2001 | Ikeda et al. | |
| 6,539,116 B2 | 3/2003 | Takaoka | |
| 6,693,718 B1 | 2/2004 | Takaoka | |
| 6,925,121 B1 | 8/2005 | Komiya et al. | |
| 6,975,755 B1 | 12/2005 | Baumberg | |
| 7,098,946 B1 | 8/2006 | Koseki et al. | |
| 7,173,666 B1 | 2/2007 | Masaki et al. | |

(Continued)

FOREIGN PATENT DOCUMENTS

| | | |
|---|---|---|
| JP | 2005-045804 | 2/2005 |
| JP | 2012-029029 | 2/2012 |

(Continued)

OTHER PUBLICATIONS

Final Office Action, U.S. Appl. No. 13/863,981 mailed Apr. 8, 2014, 26 pages.

(Continued)

*Primary Examiner* — Tuan Ho
*Assistant Examiner* — Marly Camargo
(74) *Attorney, Agent, or Firm* — McDonnell Boehnen Hulbert & Berghoff LLP

(57) ABSTRACT

An image capture device may capture a series of images. The series of images may include a plurality of metering images interleaved with a plurality of preview images. The preview images may be captured using respective total exposure times (TETs) that are based on characteristics of at least one previously-captured metering image. A viewfinder of the image capture device may display a stream of display images. Each display image in the stream of display images may be derived from at least one of the preview images, and at least part of the capturing may occur contemporaneously with at least part of the displaying.

15 Claims, 7 Drawing Sheets

(56) References Cited

U.S. PATENT DOCUMENTS

| | | | |
|---|---|---|---|
| 7,239,805 B2 | 7/2007 | Uyttendaele et al. | |
| 7,626,614 B1 | 12/2009 | Marcu | |
| 7,667,764 B2 | 2/2010 | Kamon et al. | |
| 7,840,093 B2 | 11/2010 | Fu et al. | |
| 7,903,168 B2 | 3/2011 | Pillman et al. | |
| 7,924,321 B2 | 4/2011 | Nayar et al. | |
| 7,940,325 B2 | 5/2011 | Kim et al. | |
| 7,944,485 B2 | 5/2011 | Ovsiannikov | |
| 8,023,004 B2 | 9/2011 | Asoma | |
| 8,059,891 B2 | 11/2011 | Li et al. | |
| 8,072,507 B2 | 12/2011 | Fuh et al. | |
| 8,094,211 B2 | 1/2012 | Kwon et al. | |
| 8,200,020 B1 | 6/2012 | Geiss et al. | |
| 8,208,048 B2 | 6/2012 | Lin et al. | |
| 8,237,813 B2 | 8/2012 | Garten | |
| 8,406,560 B2 | 3/2013 | Lee et al. | |
| 8,411,962 B1 | 4/2013 | Geiss et al. | |
| 8,446,481 B1 | 5/2013 | Geiss et al. | |
| 8,576,295 B2 | 11/2013 | Ito | |
| 8,866,927 B2 | 10/2014 | Levoy et al. | |
| 8,866,928 B2 | 10/2014 | Geiss | |
| 8,885,976 B1 | 11/2014 | Kuo et al. | |
| 2001/0019362 A1* | 9/2001 | Nakamura et al. | 348/222 |
| 2003/0002750 A1 | 1/2003 | Ejiri et al. | |
| 2003/0095192 A1* | 5/2003 | Horiuchi | 348/222.1 |
| 2004/0160525 A1 | 8/2004 | Kingetsu et al. | |
| 2005/0147322 A1 | 7/2005 | Saed | |
| 2005/0163380 A1 | 7/2005 | Wang et al. | |
| 2005/0239104 A1 | 10/2005 | Ferea et al. | |
| 2005/0243176 A1 | 11/2005 | Wu et al. | |
| 2006/0259155 A1 | 11/2006 | Kitahara | |
| 2006/0291740 A1 | 12/2006 | Kim et al. | |
| 2007/0003261 A1 | 1/2007 | Yamasaki | |
| 2007/0147824 A1 | 6/2007 | Hamamura | |
| 2008/0094486 A1 | 4/2008 | Fuh et al. | |
| 2008/0253758 A1 | 10/2008 | Yap et al. | |
| 2008/0278633 A1 | 11/2008 | Tsoupko-Sitnikov et al. | |
| 2008/0298717 A1 | 12/2008 | Lee | |
| 2009/0040364 A1 | 2/2009 | Rubner | |
| 2009/0123082 A1 | 5/2009 | Atanssov et al. | |
| 2009/0185622 A1 | 7/2009 | Itoh et al. | |
| 2009/0207258 A1 | 8/2009 | Jang et al. | |
| 2009/0222625 A1 | 9/2009 | Ghosh et al. | |
| 2009/0231445 A1 | 9/2009 | Kanehiro | |
| 2009/0231449 A1 | 9/2009 | Tzur et al. | |
| 2009/0231468 A1* | 9/2009 | Yasuda | 348/234 |
| 2009/0244301 A1 | 10/2009 | Border et al. | |
| 2009/0268963 A1 | 10/2009 | Kang et al. | |
| 2009/0274387 A1 | 11/2009 | Jin | |
| 2009/0322901 A1 | 12/2009 | Subbotin et al. | |
| 2010/0066858 A1 | 3/2010 | Asoma | |
| 2010/0103194 A1 | 4/2010 | Chen et al. | |
| 2010/0150473 A1 | 6/2010 | Kwon et al. | |
| 2010/0157078 A1* | 6/2010 | Atanassov et al. | 348/222.1 |
| 2010/0165075 A1 | 7/2010 | Chou et al. | |
| 2010/0166337 A1 | 7/2010 | Murashita et al. | |
| 2010/0265357 A1 | 10/2010 | Liu et al. | |
| 2010/0277631 A1 | 11/2010 | Sugiyama | |
| 2010/0321539 A1 | 12/2010 | Ito | |
| 2010/0328490 A1 | 12/2010 | Kurane et al. | |
| 2010/0328491 A1 | 12/2010 | Ovsiannikov | |
| 2011/0047155 A1 | 2/2011 | Sohn et al. | |
| 2011/0069200 A1 | 3/2011 | Oh et al. | |
| 2011/0085697 A1 | 4/2011 | Clippard et al. | |
| 2011/0149111 A1 | 6/2011 | Prentice et al. | |
| 2011/0157426 A1* | 6/2011 | Lin et al. | 348/239 |
| 2011/0200265 A1 | 8/2011 | Prigent | |
| 2011/0222793 A1 | 9/2011 | Ueda et al. | |
| 2011/0228993 A1 | 9/2011 | Reilly et al. | |
| 2011/0254976 A1 | 10/2011 | Garten | |
| 2011/0279706 A1 | 11/2011 | Lesiak et al. | |
| 2012/0002082 A1 | 1/2012 | Johnson et al. | |
| 2012/0002898 A1 | 1/2012 | Cote et al. | |
| 2012/0002899 A1 | 1/2012 | Orr, IV et al. | |
| 2012/0044381 A1 | 2/2012 | Jannard et al. | |
| 2012/0050557 A1 | 3/2012 | Atanassov et al. | |
| 2012/0105681 A1 | 5/2012 | Morales | |
| 2012/0127348 A1 | 5/2012 | Li | |
| 2012/0189197 A1 | 7/2012 | Li et al. | |
| 2012/0201426 A1 | 8/2012 | Jasinski et al. | |
| 2012/0201450 A1 | 8/2012 | Bryant et al. | |
| 2012/0201456 A1 | 8/2012 | El-Mahdy et al. | |
| 2012/0219235 A1 | 8/2012 | Solhusvik et al. | |
| 2012/0249828 A1 | 10/2012 | Sun | |
| 2012/0308126 A1 | 12/2012 | Hwang et al. | |
| 2012/0314100 A1 | 12/2012 | Frank | |
| 2013/0033616 A1 | 2/2013 | Kaizu et al. | |
| 2013/0083216 A1 | 4/2013 | Jiang et al. | |
| 2013/0100314 A1 | 4/2013 | Li et al. | |
| 2013/0121569 A1 | 5/2013 | Yadav | |
| 2013/0329092 A1 | 12/2013 | Wong | |
| 2014/0042233 A1 | 2/2014 | Yang | |
| 2014/0219578 A1 | 8/2014 | Peng et al. | |

FOREIGN PATENT DOCUMENTS

| | | |
|---|---|---|
| KR | 10-2007-0085867 | 8/2007 |
| KR | 10-0911814 | 8/2009 |
| KR | 10-2010-0086987 | 8/2010 |
| WO | 98/02844 | 1/1998 |
| WO | 2004/098167 | 11/2004 |
| WO | 2011/093994 | 8/2011 |
| WO | 2011/102850 | 8/2011 |
| WO | 2012/027290 | 3/2012 |
| WO | 2012/039669 | 3/2012 |
| WO | 2012/061261 | 5/2012 |
| WO | 2012/098842 | 7/2012 |
| WO | 2012/110894 | 8/2012 |

OTHER PUBLICATIONS

Office Action, U.S. Appl. No. 13/713,720, mailed Apr. 8, 2014, 46 pages.

Jin et al., "Face Detection Using Improved LBP Under Bayesian Framework," Proceedings of the Third International Conference on Image and Graphics (ICIG'04), 2004, pp. 1-4.

Mandava et al., "Speckle Noise Reduction Using Local Binary Pattern," 2nd International Conference on Communication, Computing & Security (ICCCS—2012), Procedia Technology, 2012, pp. 574-581, vol. 6.

Office Action for U.S. Appl. No. 13/743,565 mailed Sep. 4, 2014, 20 pages.

Office Action for U.S. Appl. No. 13/722,519 mailed Sep. 4, 2014, 10 pages.

Office Action for U.S. Appl. No. 13/863,981 mailed Oct. 7, 2013, 45 pages.

International Searching Authority, International Search Report and Written Opinion for PCT/US2013/072638 mailed Mar. 11, 2014, 10 pages.

International Searching Authority, International Search Report and Written Opinion for PCT/US2013/071663 mailed Mar. 13, 2014, 9 pages.

International Searching Authority, International Search Report and Written Opinion for PCT/US2013/72564 mailed Mar. 11, 2014, 13 pages.

International Searching Authority, International Search Report and Written Opinion for PCT/US2013/071459 mailed Mar. 13, 2014, 9 pages.

International Searching Authority, International Search Report and Written Opinion for International Application No. PCT/US2014/038963 mailed Sep. 17, 2014, 12 pages.

Office Action for U.S. Appl. No. 13/718,533 mailed Apr. 22, 2014, 48 pages.

Office Action for U.S. Appl. No. 13/863,981 mailed Jun. 24, 2014, 23 pages.

Notice of Allowance for U.S. Appl. No. 13/718,533 mailed Jul. 18, 2014, 9 pages.

Notice of Allowance for U.S. Appl. No. 13/713,720 mailed Jul. 18, 2014, 13 pages.

(56) References Cited

OTHER PUBLICATIONS

Nayar et al., "Adaptive Dynamic Range Imaging: Optical Control of Pixel Exposures Over Space and Time," Proceedings of the Ninth IEEE International Conference on Computer Vision (ICCV'03), 2003, pp. 1-8.

Duan et al., "Tone-mapping High Dynamic Range Images by Novel Histogram Adjustment," Pattern Recognition, 2010, 39 pages, vol. 43, No. 5.

"Exposure (photography)," Wikipedia, the free encyclopedia, Jun. 21, 2012, pp. 1-8 (http://en.wikipedia.org/wiki/Autoexposure#Automatic_exposure).

"JPEG," Wikipedia, the free encyclopedia, Jul. 31, 2012, pp. 1-16 (http://en.wikipedia.org/wiki/JPEG).

"High dynamic range imaging," Wikipedia, the free encyclopedia, Jun. 21, 2012, pp. 1-11 (http://en.wikipedia.org/wiki/High_dynamic_range_imaging).

"Tone mapping," Wikipedia, the free encyclopedia, Jun. 21, 2012, pp. 1-10 (http://en.wikipedia.org/wiki/Tone_mapping).

"Metering mode," Wikipedia, the free encyclopedia, Jun. 25, 2012, pp. 1-3 (http://en.wikipedia.org/wiki/Metering_mode).

"YCbCr," Wikipedia, the free encyclopedia, Jul. 31, 2012, pp. 1-5 (http://en.wikipedia.org/wiki/YCbCr).

Lowe, D.G., "Object Recognition from Local Scale-Invariant Features," Proc. of the International Conference on Computer Vision, Sep. 20-22, 1999, pp. 1150-1157, vol. 2.

Brown, M. & Lowe, D., "Invariant Features from Interest Point Groups," Computer, (2002) p. 253-262, Available at: http://citeseerx.ist.psu.edu/viewdoc/download?doi=10.1.1.73.5616&rep=rep1&type=pdf.

Winder, S.A.J. and Brown, M., "Learning Local Image Descriptors," Computer Vision and Pattern Recognition, 2007. CVPR '07. IEEE Conference on in Computer Vision and Pattern Recognition, 2007. CVPR '07. IEEE Conference on (Jun. 2007), pp. 1-8. doi:10.1109/CVPR.2007.382971 Key: citeulike:1663569.

Sinha et al., "Feature Tracking and Matching in Video Using Programmable Graphics Hardware," Machine Vision and Applications, DOI 10.1007/s00138-007-0105-z, Nov. 2007.

Wagner et al., "Pose Tracking from Natural Features on Mobile Phones," Proceeding ISMAR '08 Proceedings of the 7th IEEE/ACM International Symposium on Mixed and Augmented Reality IEEE Computer Society Washington, DC, USA, Sep. 15-18, 2008, pp. 125-134.

Özuysal et al., "Fast Keypoint Recognition in Ten Lines of Code," Computer Vision and Pattern Recognition, IEEE Computer Society Conference on in Computer Vision and Pattern Recognition, 2007. CVPR '07. IEEE Conference on, vol. 0 (2007), pp. 1-8. doi:10.1109/CVPR.2007.383123 Key: citeulike:2943111.

Bay et al., "SURF: Speeded Up Robust Features," 9th European Conference on Computer Vision, 2008, pp. 346-359, vol. 110, No. 3.

Ta, Duy-Nguyen et al., "SURFTrac: Efficient Tracking and Continuous Object Recognition using Local Feature Descriptors," IEEE Computer Society Conference on Computer Vision and Pattern Recognition, 2009, pp. 2937-2944.

Bauer et al., "Comparing Several Implementations of Two Recently Published Feature Detectors," In Proc. of the International Conference on Intelligent and Autonomous Systems, IAV, Toulouse, France (2007).

Sift, accessed on Oct. 21, 2011, from Wikipedia, http://en.wikipedia.org/w/index.php?title=Special: Book&bookcmd=download&collection_id=1bf75abdad524091&writer=rl&return_to=Scale-invariant+feature+transform.

SURF, accessed on Oct. 24, 2011, from Wikipedia, http://en.wikipedia.org/wiki/SURF.

Wagner et al., "Real-time detection and tracking for augmented reality on mobile phones," IEEE Trans Vis Comput Graph, May-Jun. 2010, pp. 355-68, vol. 16, No. 3.

SynthCam iPhone, https://sites.google.com/site/marclevoy/Tutorial accessed Oct. 24, 2011.

Karpenko et al., "Digital Video Stabilization and Rolling Shutter Correction using Gyroscopes," Stanford Tech Report CTSR Mar. 2011, http://graphics.stanford.edu/papers/stabilization/karpenko_gyro.pdf (Sep. 2011).

Gelfand, Natasha, et al. "Multi-exposure imaging on mobile devices." In Proceedings of the international conference on Multimedia, ACM, 2010, pp. 823-826.

Notice of Allowance for U.S. Appl. No. 13/610,288 mailed Feb. 28, 2013, 31 pages.

Cyganek, Boguslaw, "Comparison of nonparametric transformations and bit vector matching for stereo correlation." Combinatorial Image Analysis, 2005, pp. 534-547.

Zabih et al., "Non-parametric Local Transforms for Computing Visual Correspondence," In Proceedings of European Conference on Computer Vision, Stockholm, Sweden, May 1994, pp. 151-158.

Fife, Wade S. et al., "Improved Census Transforms for Resource-Optimized Stereo Vision," IEEE Transactions on Circuits and Systems for Video Technology, Jan. 2013, vol. 23, No. 1, pp. 60-73.

Hansen, Christian et al., "Chapter 1: The Image Deblurring Problem," Deblurring Images: Matrices, Spectra, and Filtering, SIAM, Philadelphia, 2006, pp. 1-12.

Seemann, Torsten et al., "Structure preserving noise filtering of images using explicit local segmentation." Fourteenth International Conference on Pattern Recognition, IEEE, 1998, vol. 2, pp. 1610-1612.

International Search Report and Written Opinion for PCT/US2014/011498 mailed Apr. 22, 2014, 11 pages.

Notice of Allowance for U.S. Appl. No. 13/305,389 mailed Feb. 22, 2012, 9 pages.

Notice of Allowance for U.S. Appl. No. 13/458,334 mailed Oct. 11, 2012, 34 pages.

International Searching Authority, International Search Report and Written Opinion for PCT/US20131071618 mailed Mar. 3, 2014, 9 pages.

International Searching Authority, International Search Report and Written Opinion for PCT/US20131072569 mailed Mar. 6, 2014, 9 pages.

Office Action for U.S. Appl. No. 13/759,749 mailed Sep. 24, 2014, 38 pages.

Final Office Action for U.S. Appl. No. 13/863,981 mailed Dec. 24, 2014, 21 pages.

Office Action for U.S. Appl. No. 13/713,734 mailed Dec. 24, 2014, 12 pages.

Notice of Allowance for U.S. Appl. No. 13/743,565 mailed Dec. 2, 2014, 15 pages.

Notice of Allowance for U.S. Appl. No. 14/455,444 mailed Oct. 2, 2014, 9 pages.

Office Action for U.S. Appl. No. 13/902,254 mailed Dec. 2, 2014, 9 pages.

Office Action for U.S. Appl. No. 13/902,267 mailed Dec. 12, 2014, 12 pages.

Office Action for U.S. Appl. No. 13/722,519, filed Feb. 19, 2015, 11 pages.

Office Action for U.S. Appl. No. 14/488,891, filed Feb. 13, 2015, 6 pages.

Office Action for U.S. Appl. No. 13/847,238, filed Jan. 2, 2015, 6 pages.

* cited by examiner

| | IMAGE CAPTURE | TET | | | | | | | | | |
|---|---|---|---|---|---|---|---|---|---|---|---|
| SWEEP 1 | | M1 | P1 | M2 | P2 | M3 | P3 | M4 | P4 | M5 | P5 |
| | | 2 | 100 | 8 | 70 | 32 | 50 | 128 | 48 | 512 | 48 |
| SWEEP 2 | IMAGE CAPTURE | M1 | P1 | M2 | P2 | M3 | P3 | M4 | P4 | M5 | P5 |
| | TET | 2 | 48 | 8 | 48 | 32 | 48 | 128 | 82 | 512 | 126 |
| SWEEP 3 | IMAGE CAPTURE | M1 | P1 | M2 | P2 | M3 | P3 | M4 | P4 | M5 | P5 |
| | TET | 2 | 126 | 8 | 126 | 32 | 126 | 128 | 126 | 512 | 126 |

|  |  | M1 | S1 | L1 | M2 | S2 | L2 | M3 | S3 | L3 | M4 | S4 | L4 | M5 | S5 | L5 |
|---|---|---|---|---|---|---|---|---|---|---|---|---|---|---|---|---|
| SWEEP 4 | IMAGE CAPTURE | M1 | S1 | L1 | M2 | S2 | L2 | M3 | S3 | L3 | M4 | S4 | L4 | M5 | S5 | L5 |
|  | TET | 2 | 4 | 100 | 8 | 12 | 130 | 32 | 25 | 140 | 128 | 25 | 140 | 512 | 25 | 140 |
| SWEEP 5 | IMAGE CAPTURE | M1 | S1 | L1 | M2 | S2 | L2 | M3 | S3 | L3 | M4 | S4 | L4 | M5 | S5 | L5 |
|  | TET | 2 | 25 | 140 | 8 | 25 | 140 | 32 | 25 | 140 | 128 | 25 | 140 | 512 | 37 | 209 |
| SWEEP 6 | IMAGE CAPTURE | M1 | S1 | L1 | M2 | S2 | L2 | M3 | S3 | L3 | M4 | S4 | L4 | M5 | S5 | L5 |
|  | TET | 2 | 43 | 222 | 8 | 43 | 222 | 32 | 16 | 155 | 128 | 30 | 155 | 512 | 30 | 155 |

FIG. 5

VIEWFINDER DISPLAY BASED ON METERING IMAGES

BACKGROUND

Imaging may refer to capturing and representing the color and brightness characteristics of digital images (e.g., photographs and motion video). Low dynamic range (LDR) imaging may represent digital images with 8 or fewer bits for each color channel of a pixel. As a result, up to 256 levels of brightness may be supported. Currently, a wide range of video output devices (e.g., computer monitors, tablet and smartphone screens, televisions, etc.) support displaying LDR images.

However, real-world scenes often exhibit a wider range of brightness than can be represented by LDR imaging. As an example scene with a wide brightness range, consider an individual standing in a dark room in front of a window. This scene may include both extremely bright regions (e.g., sunlit features outside the window) and extremely dark regions (e.g., the features in the room). This scene may be considered to be a high dynamic range (HDR) scene, and some details of the scene might not be able to be properly exposed in a single captured image.

SUMMARY

In order to adequately capture the details of an HDR scene with an image capture device, and to represent the scene on a video output device that might only be able to properly display LDR images, multiple images of the scene may be captured using different exposure times. For instance, one captured image may properly expose the darker sections of the HDR scene, while another captured image may properly expose the brighter sections of the HDR scene. Combining the properly exposed sections of these captured images may result in a single LDR image that exhibits reasonable exposure of most, or all, features of the HDR scene. This combined LDR image may be stored for later display and/or manipulation. Ideally, prior to capturing the images, the image capture device's viewfinder would be able to display a representation of the scene that is identical to, is close to, or that approximates this combined LDR image.

Accordingly, in a first example embodiment, an image capture device may capture a series of images. The series of images may include a plurality of metering images interleaved with a plurality of preview images. The preview images may be captured using respective total exposure times (TETs) that are based on characteristics of at least one previously-captured metering image. The viewfinder of the image capture device may display a stream of display images. Each display image in the stream of display images may be derived from at least one of the preview images. At least part of capturing of the series of images may occur contemporaneously with at least part of the displaying.

A second example embodiment may include means for capturing a series of images. The series of images may include a plurality of metering images interleaved with a plurality of preview images. The preview images may be captured using respective TETs that are based on characteristics of at least one previously-captured metering image. The second example embodiment may also include means for displaying a stream of display images. Each display image in the stream of display images may be derived from at least one of the preview images. At least part of capturing of the series of images may occur contemporaneously with at least part of the displaying.

A third example embodiment may include an image capture device capturing a first metering image and a first set of one or more preview images. The first set of preview images may be captured using respective TETs that are based on characteristics of the first metering image. The image capture device may also capture a second metering image and a second set of one or more preview images. The second set of preview images may be captured using respective TETs that are based on characteristics of the second metering image. A viewfinder of the image capture device may display a display image. The display image may be derived from at least one of the first set of preview images. Further, at least part of capturing the second metering image and the second set of preview images may occur contemporaneously with at least part of the displaying.

A fourth example embodiment may include means for capturing a first metering image and a first set of one or more preview images. The first set of preview images may be captured using respective TETs that are based on characteristics of the first metering image. The fourth example embodiment may also include means for capturing a second metering image and a second set of one or more preview images. The second set of preview images may be captured using respective TETs that are based on characteristics of the second metering image. The fourth example embodiment may additionally include means for displaying a display image. The display image may be derived from at least one of the first set of preview images. Further, at least part of capturing the second metering image and the second set of preview images may occur contemporaneously with at least part of the displaying.

A fifth example embodiment may include a non-transitory computer-readable storage medium, having stored thereon program instructions that, upon execution by a computing device, cause the computing device, and/or its peripherals, to perform operations in accordance with the first, second, third and/or fourth example embodiment.

A sixth example embodiment may include a computing device, comprising at least a processor and data storage. The data storage may contain program instructions that, upon execution by the processor, cause the computing device, and/or its peripherals, to operate in accordance with the first, second, third and/or fourth example embodiment.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 4 depicts an arrangement of image captures, in accordance with an example embodiment.

FIG. 5 depicts another arrangement of image captures, in accordance with an example embodiment.

DETAILED DESCRIPTION

Figure 1:
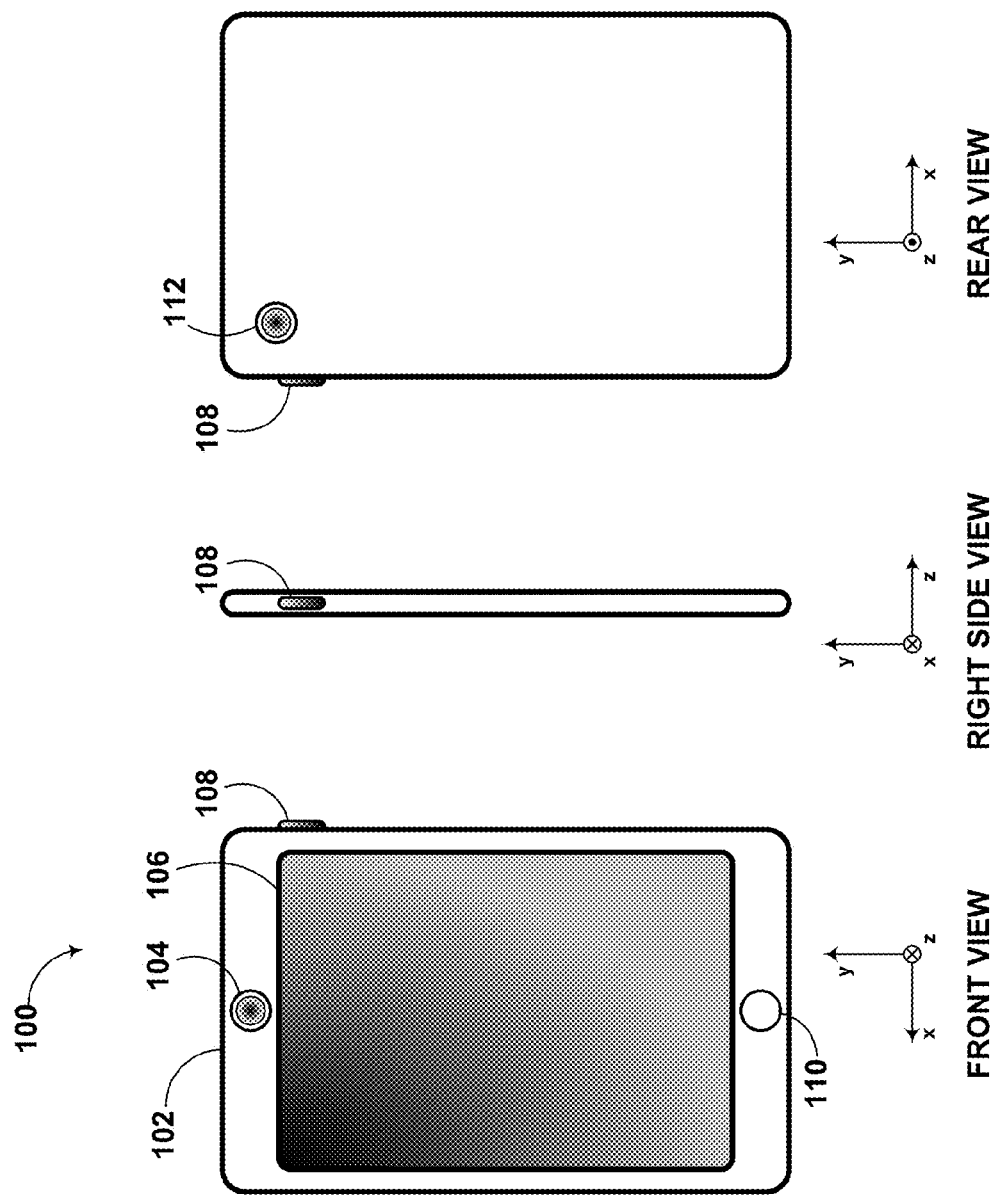
FIG. 1 depicts front, right side, and rear views of a digital camera device, in accordance with an example embodiment.

As image capture devices, such as cameras, become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may include an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For electronic shutters, light may be reaching the recording surface, or sensor, at all the times that the image capture device is in "camera mode." However, the sensor might or might not be powered. If the sensor is not powered, image capture does not take place. On the other hand, if the sensor is powered, image capture may take place. Additionally, before an electronic shutter of an image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Moreover, various types of shutters may be used. For instance, for a global shutter, all bits on the recording surface may be read at the same time or approximately the same time. Similarly, all bits on the recording surface may be cleared at the same time or approximately the same time. Global shutters tend to use more physical space on a recording surface, which means that there may be less of this space left, per pixel, to receive photons.

For a rolling shutter, bits on the recording surface may be read one scanline (e.g., a horizontal or vertical line of bits) at a time. Similarly, bits on the recording surface may be cleared one scanline at a time. In some cases, in order to make each scanline have the same exposure time, there may be a rolling clear that precedes each rolling read. Rolling shutters tend to use less physical space on a recording surface, but can introduce distortion in captured images where the image capture device or scene exhibits movement during image capture.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
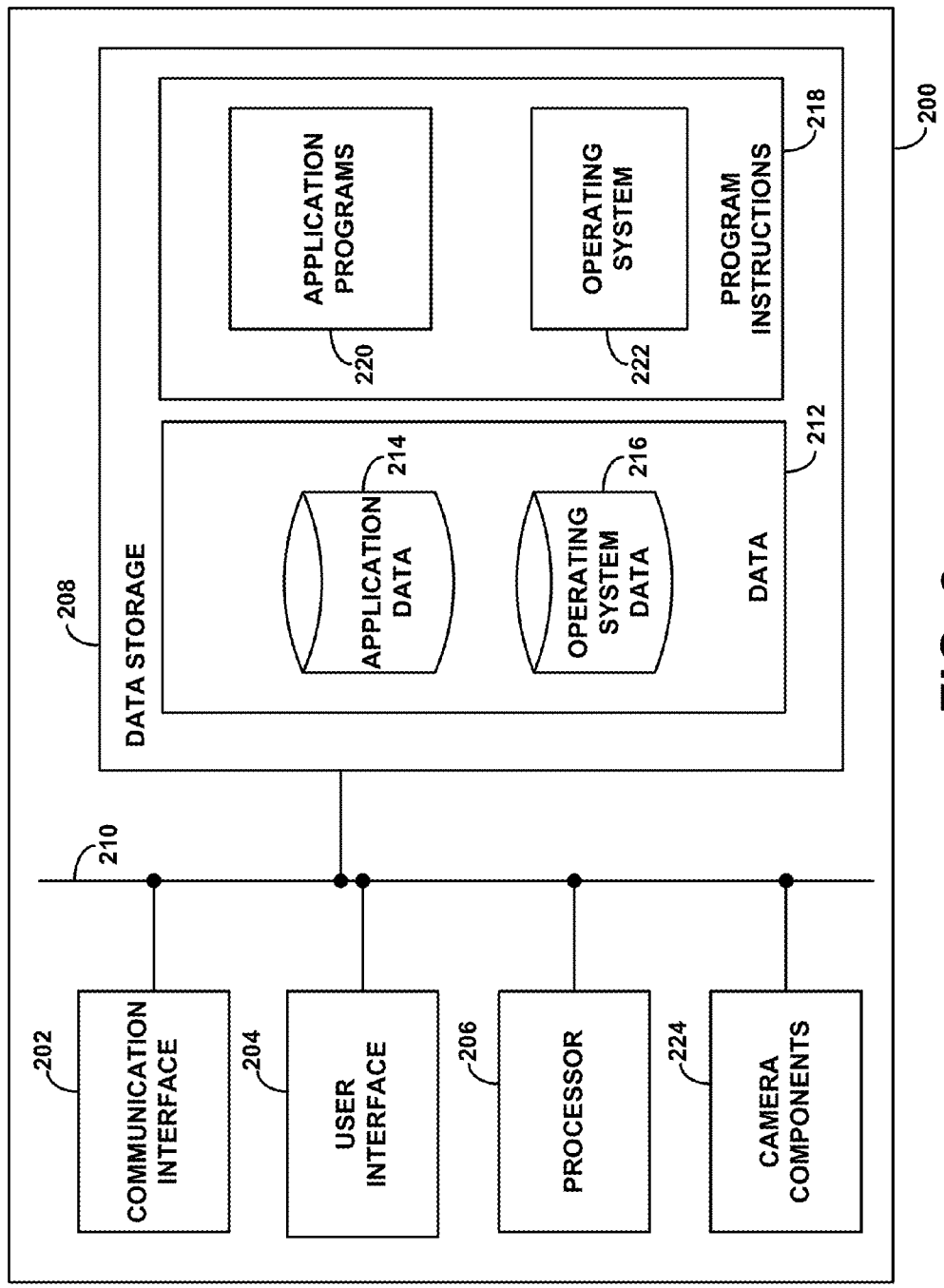
FIG. 2 depicts a block diagram of a computing device with image capture capability, in accordance with an example embodiment.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model (which may also be referred to as the YUV color model). In this color model, the Y color channel may represent the brightness of a pixel, and the Cb (U) and Cr (V) color channels may represent the blue chrominance and red chrominance, respectively, of the pixel. For instance, each of these color channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing so is referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the TET with which the image was captured.

A short TET may result in a reasonably accurate representation of the bright regions of a scene, but underexposure of the dark regions. Conversely, a long TET may result in a reasonably accurate representation of the dark regions, but may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

Camera devices may support an auto-exposure (AE) mode in which, prior to output image capture, the camera determines the TET based on the brightness of the scene. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128). Refining the TET in order to obtain the target scene brightness might be done with actual exposures, or done using synthetic exposures from one or more metering bursts. In some embodiments, a TET may be determined directly from one or more histograms of a scene without the intermediate step of determining a target scene brightness.

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

High dynamic range (HDR) imaging has been proposed as a way of compensating for the deficiencies of LDR imaging. In a possible implementation, HDR imaging may involve a camera capturing multiple images of a scene at various TETs, and then digitally processing these captured images to make a single image that contains a reasonable representation of the details in most or all regions of the scene, including those that are very bright and very dark. However, determining TETs for capturing images can be problematic. In particular, difficulty in adjusting TETs for a particular scene has created limitations in HDR imaging. The methods and implementations described herein may provide computational efficiency, robustness to artifacts, and/or enhanced image quality.

In the following, the term "LDR image" may refer to an image captured using LDR imaging, and the term "LDR scene" may refer to a scene that has been determined to be reasonably represented using LDR imaging. Similarly, the term "HDR image" may refer to an image captured using HDR imaging, and the term "HDR scene" may refer to a scene that has been determined to be reasonably represented using HDR imaging. Furthermore, the term "LDR imaging" may be used interchangeably with the term "LDR image acquisition," and the term "HDR imaging" may be used interchangeably with the term "HDR image acquisition."

Figure 3:
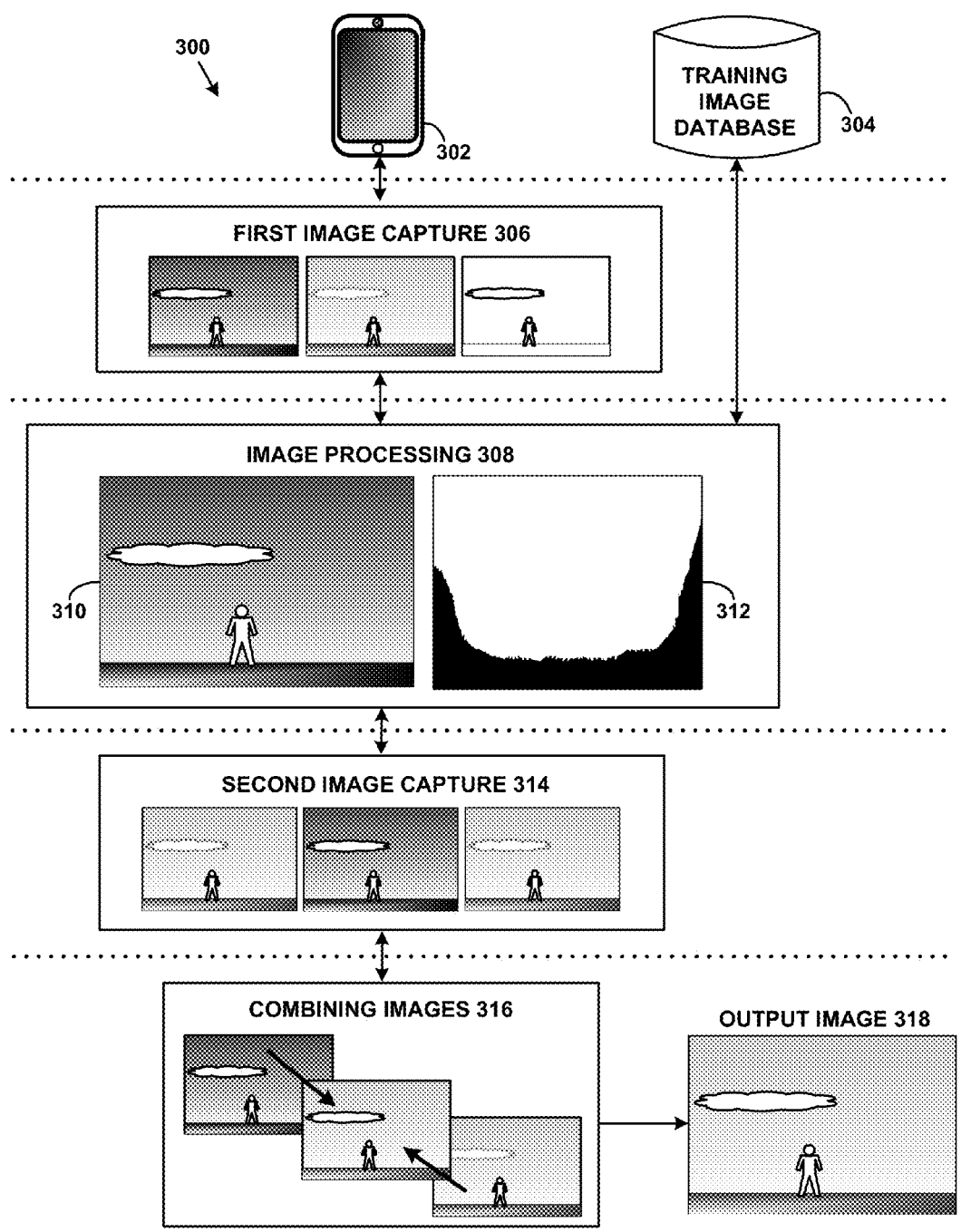
FIG. 3 depicts a flow chart, in accordance with an example embodiment.

FIG. 3 depicts a flow chart, in accordance with an example embodiment. At a high level, flow chart 300 represents an imaging pipeline for a digital camera device 302. For instance, flow chart 300 may represent a number of steps performed by digital camera device 302 to determine whether to use LDR or HDR image acquisition for a particular scene, determine one or more TETs with which to capture images of the scene, and whether and/or how to combine the captured images into an output image that is a reasonably satisfactory representation of the scene. In this way, digital camera device 302 can dynamically adapt to the lighting pattern of the scene, whether that pattern is dark, bright, or some combination of both. Digital camera device 302 may have the same or similar capabilities as digital camera device 100 in FIG. 1.

Flow chart 300 may represent a series of steps performed by digital camera device 302 when a shutter button is triggered. Alternatively or additionally, flow chart 300 may represent steps that are continuously performed when a viewfinder of digital camera device 302 is displaying a representation of a scene. Thus, in some embodiments, the features of flow chart 300 may be performed in a way that is not apparent to the user. For instance, the user may trigger the shutter once, with the intention of capturing a single image. However, digital camera device 302 may capture multiple images in each of first image capture 306 and second image capture 314, and provide an output image 318 that is a combination of one or more images captured during second image capture 314.

It should be noted that not all steps depicted in FIG. 3 need be performed by digital camera device 302. Some steps, such as image processing 308 and combining images 316, for example, could be performed by a different device. For instance, representations of one or more images captured during first image captures 306 and second image capture 314 could be transmitted from a capturing device to a remote computing device. The remote computing device could then perform image processing 308 and combining images 316, possibly transmitting some or all of the results thereof to the capturing device.

Additionally, training image database 304 may be included in digital camera device 302 or alternatively, training image database 304 may be part of a separate device or system that may be accessed by digital camera device 302. In some embodiments, training image database 304 may include representations of training images that can be used to help determine the structure of a payload burst used in second image capture 314.

In first image capture 306, a first group of images of a scene may be captured using a "metering burst sweep." In a metering burst sweep, each image in the group may be captured using a different TET. In some instances, the metering burst sweep may capture consecutive images across a range of TETs (e.g., 1-300 milliseconds, 0.1-500 milliseconds, or some other range).

One possible range of the sweep may be the full range of TETs that could potentially be used for image capture. For example, the range could start with a TET of 0.05 milliseconds (an exposure time of 0.05 milliseconds and no gain) and end with a TET of 2112 milliseconds (e.g., an exposure time of 66 milliseconds with 8× analog gain and 4× digital gain).

In some cases, the range of TETs may be narrowed or changed based on a reading from an ambient light sensor that is associated with the image capture device. For instance, if the ambient light sensor indicates that the scene is generally dark, the range of TETs may be narrowed or focused on longer TETs (e.g., TETs from 10 milliseconds to 500 milliseconds), but if the ambient light sensor indicates that the scene is generally bright, the range of TETs may narrowed or focused on shorter TETs (e.g., TETs from 0.05 milliseconds to 50 milliseconds).

Using such ranges of TETs, the metering burst sweep may capture a series of images with TETs designed to cover this range according to a linear, logarithmic, and/or exponential distribution of TETs, among other possibilities. As an example, FIG. 3 depicts first image capture 306 including three digital images of a scene, each captured using a different TET. The three images exhibit diverse levels of brightness due to the different TETs used to capture the images. In other examples, more or fewer images may be captured during first image capture 306. These captured images may provide parameters for digital camera device 302 to use when capturing subsequent images of the scene.

The metering burst sweep can be used to determine the characteristics of the scene so that a subsequent payload burst structure for second image capture 314 can be selected. Therefore, in step 308, the images captured at step 306 may be processed. Particularly, step 308 may include merging one or more of the images captured at step 306 in a combined image 310. Step 308 may also include forming a histogram 312 from the merged images, and then using the histogram, and possibly some or all of the information in training image data 304, to classify the scene (e.g., as an LDR scene or an HDR scene), determine the structure of the payload burst based on the classification of the scene, and determine the TETs to use when capturing images according to the payload burst. In some embodiments, the captured images, shown as a result of first image capture 306, may be downsampled prior to merging. Further, the histogram may be an LDR histogram, HDR histogram, a log HDR histogram, or some other form of histogram.

In step 314, the second group of images may be captured. The number of images captured and the arrangement of TETs used to capture these images may be referred to as a "payload burst." For example, in FIG. 3 second image capture 314 includes three images of a scene, each captured using a TET identified in step 308. It should be understood that the TETs identified in step 308 may be the same or different than the TETs used to capture images in step 306. Additionally, it is possible that all three images in second image capture 314 are captured using the same or similar TETs.

In step 316, images from the second group of images may be combined. Combining images may include aligning two or more of the images. In some instances, images may be aligned globally (i.e., aligning whole images as opposed to portions of images), locally (i.e., aligning portions of images perhaps at the pixel block and/or individual pixel level), or possibly both globally and locally. Further, combining two or more images may also include merging them to form an output image 318. This merging may be carried out in accordance with any image fusion technique now known or developed in the future.

Merging the images in the second group of images may result in output image 318 being sharper and/or better-exposed than any of the individual images in the second group. For instance, if some of the images in second image capture 314 are captured using the same or similar TETs, these images may be merged to reduce noise in one or more sections of the images. Alternatively or additionally, if the images in second image capture 314 are captured using two or more different TETs, at least some images with different exposure times may be merged according to HDR procedures. Regardless, the output image may be stored on a computer-readable medium and/or displayed on an output medium such as the multi-element display 106 of FIG. 1.

In some embodiments, the arrangements of various possible payload burst structures may be determined based on the TETs determined in step 308, as well as an understanding of combining images step 316. While numerous arrangements of payload burst structures may be possible, three examples are described herein.

TABLE 1

| Scene Type | Payload Burst Structure |
|---|---|
| LDR | T T T T |
| HDR | L S L L S L L S L L |
| HDR (with fallback) | L S L L S L L F F F |

Table 1 illustrates these examples. In the first example, the scene type is LDR. In this example, the payload burst structure includes four images captured sequentially, and may be referred to as an "LDR burst structure." Each "T" in the Payload Burst Structure column of Table 1 may represent a captured image. Each of these images may be captured using the same or a similar TET that was determined in step 308. In some embodiments, fewer or more images may be captured in an LDR payload burst. For example, as few as one, or as many as ten or more images may be included.

Regardless of the number of images captured, some of these images may be aligned and combined in step 316. For instance, if m images are captured in the payload burst, the sharpest one of these images may be selected as a "primary image," and the remaining m–1 images may be considered "secondary images." In some implementations, the sharpness of an image may be measured by the image's resolution and/or boundaries between zones of different tones and/or colors in the image. Alternatively or additionally, other sharpness measurements may be used.

Further, zero or more of the m–1 secondary images may then be aligned and merged with the sharpest image. For instance, alignment may be attempted between each of the secondary images and the sharpest image, respectively. If the alignment fails for parts of a respective secondary image, those parts may be discarded, and not combined with the primary image. In this way, the sharpest image may be denoised with information from some or all of the secondary images.

In the second example, the scene type is HDR. In this example, the payload burst structure includes ten images captured according to a pattern of long and short TETs, and may be referred to as an "HDR burst structure." In the Payload Burst Structure column of Table 1, each "L" may represent an image captured using the long TET, each "S" may represent an image captured using the short TET. Thus, the pattern of "L S L L S L L S L L" may indicate that the first image of the payload burst is captured using the long TET, the second image is captured using the short TET, the third and fourth images are captured using the long TET, the fifth image is captured using the short TET, the sixth and seventh images are captured using the long TET, the eighth image is captured using the short TET, the ninth image is captured using the long TET, and the tenth image is captured using the long TET.

The long and short TETs may be determined based on the results of image processing 308. Thus, the long and short TETs may be selected so that the resulting images captured using these TETs can be combined using HDR procedures. The long TET may be used to capture the details in dark sections of the scene, while the short TET may be used to capture the details in bright sections of the scene.

Examples of short TET values may include TETs of 1 millisecond, 2 milliseconds, and/or 8 milliseconds, while examples of long TET values may include TETs of 20 milliseconds, 40 milliseconds, and/or 80 milliseconds. However, short and long TETs may take on different values.

Despite the payload burst in the second example having a particular structure in Table 1, other structures may be used. For example, payload burst structures of "L S L S L S L S L S" or "L L S L L S L L S L" could potentially provide suitable patterns of long and short TETs. Further, some payload burst structures may include fallback TETs (denoted by an "F"). Thus, additional example payload bursts may include "S F L L L S F L L L" or "S F L S F L S F L L" structures.

In some embodiments, a payload burst structure may include more or fewer than ten images. Generally speaking, the determining the length of the payload burst structure involves a tradeoff. On one hand, a long payload burst (i.e., a payload burst with a large number of image captures) is desirable because the likelihood of one or more of the captured image being well-exposed and sharp is increased. On the other hand, if the payload burst is too long, the likelihood of ghosting (double images or slightly offset, faded copies of an image) due to movement in the scene is also increased. Additionally, darker scenes may benefit from images captured using a longer TET, so that more light can reach the recording surface. Therefore, the payload burst structure may be based, possibly in part, on these considerations.

In the third example, the scene type is also HDR. However, in this example, the associated payload burst structure (which also may be referred to as an HDR burst structure) includes seven images captured according to a pattern of long and short TETs, followed by three fallback TETs. Each "F" may represent an image captured using the fallback TET, and the fallback TET may take on a value different from both the long and short TETs.

Regardless of the type of payload burst structure, the images of an HDR scene may be aligned and combined. Images captured using the short TET may be referred to as "short images" for convenience, and images captured using the long TET may be referred to as "long images" for convenience.

In some embodiments, the sharpest short image may be selected, from the short images, as the primary short image. Zero or more of the remaining secondary short images may then be aligned and merged with the primary short image. For instance, alignment may be attempted between each of the secondary short images and the primary short image, respectively. If the alignment fails for parts of the respective secondary short image, those parts may be discarded, and not combined with the primary short image. In this way, the sharpest short image may be de-noised with information from some of the secondary short images.

The same or a similar process may be undertaken for the long images. For example, the sharpest long image may be selected, from the long images, as the primary long image. Zero or more of the remaining secondary long images may then be aligned and merged with the primary long image. Alignment may be attempted between each of the secondary long images and the primary long image, respectively. If the alignment fails for parts of the respective secondary long image, those parts may be discarded, and not combined with the primary long image.

The resulting combined short image (e.g., the sharpest short image possibly de-noised by information from zero or more secondary short images) and the resulting combined long image (e.g., the sharpest long image possibly de-noised by information from zero or more secondary long images) may then be aligned. If the alignment succeeds, these two images (e.g., both LDR images) may be combined according to HDR procedures. For instance, they may be combined into an HDR image, and the HDR image may then be locally tonemapped so that its brightness falls within a range commensurate with the display abilities of convention video output devices (e.g., pixel values between 0 and 255, inclusive). The resulting locally tonemapped HDR image may be designated as output image 318. In some embodiments, if the signal-to-noise ratio of part or all of output image 318 is still lower than a threshold value, a de-noising procedure may be applied to further reduce noise. Additionally, output image 318 may also be sharpened, possibly after applying the de-noising procedure. In general, various types of HDR fusion algorithms, such as Exposure Fusion or Local Laplacian Filters, may be used to merge short and long images. If fallback TETs are used in the payload burst structure, these HDR fusion algorithms may be applied to one or more fallback images as well.

If the alignment fails between the combined short image and the combined long image, then the HDR processing fails. However, if fallback images were captured, one or more of the fallback images may be used to form output image 318. For instance, the sharpest fallback image may be selected. Zero or more of the remaining secondary fallback images may be aligned and combined with the sharpest fallback image carried out in a similar fashion as the processes described above for the short and long images. For payload burst structures without fallback images in which alignment fails, the combined long or short image may be used to form output image 318.

As noted above, an image capture device may include a shutter coupled to or nearby a lens and/or a recording surface. The shutter may either be in a closed position, in which it blocks light from reaching the recording surface, or an open position, in which light is allowed to reach to recording surface. The position of the shutter may be controlled by the image capture device.

For instance, the shutter may be in the closed position by default. When an image capture function is activated (e.g., the image capture device is put into a "camera mode"), the shutter may begin to open and close (e.g., mechanically and/or electronically) at a frequency referred to as the shutter cycle. During a shutter cycle, an image may be captured on the recording surface. At the end of the shutter cycle, the shutter may change back to the closed position. By repeatedly opening and closing the shutter at a relatively high speed (e.g., at 30 cycles per second), a series of images can be captured, and representations of these images may be continuously displayed on a viewfinder (e.g., multi-element display 106). These representations may be captured rapidly enough to appear as a video stream of the scene at which the lens is directed.

While in "camera mode," if a shutter button is triggered, image recording may be activated. This may cause the image capture device to transfer one or more images from the stream to a recording medium, such as computer memory, for manipulation and/or longer-term storage. In this way, the viewfinder may be used to adjust the aim, focus, exposure, and/or other aspects of the image capture device as desired before recording a particular image in longer-term memory. In some embodiments, triggering image capture may result in the viewfinder displaying the captured and recorded image for a period of time (e.g., a few seconds).

Thus, a user may observe the stream of images on the viewfinder until he or she is satisfied with the scene to be captured. The user may then trigger the shutter button and observe the captured and recorded image on the viewfinder to determine whether this image is acceptable. Subsequently, the viewfinder may display further images in the stream so that additional image capturing and recording may occur.

As noted above in the context of FIG. 3, a number of metering images may be captured, possibly compared to one another, and target TETs for subsequent preview image captures may be determined. The captured preview images may be displayed on the viewfinder. It is desirable for an image capture device to support these metering bursts, but also to be able to display, on the viewfinder, an accurate representation of how the image capture device will capture and represent the scene. For instance, when the shutter button is triggered, the image that is captured and stored should resemble at least some of the images recently displayed on the viewfinder.

One possible way of doing so involves interleaving metering image captures with preview image captures. FIG. 4 illustrates such procedures for LDR scenes. Particularly, FIG. 4 includes three sweeps: sweep 1, sweep 2, and sweep 3. Each sweep includes a series of metering image captures (M1, M2, M3, M4, M5) and a series of preview image captures (P1, P2, P3, P4, P5). The image capture sweeps depicted in FIG. 4 may occur consecutively to one another. Thus, sweep 2 may immediately follow sweep 1, and sweep 3 may immediately follow sweep 2.

The metering image captures may result in captured metering images that may be used in accordance with FIG. 3. Thus, for example, the metering image captures may be a metering burst sweep in accordance with first image capture 306. In FIG. 4, for each sweep, the TET pattern used for respective metering image captures repeats. Thus, each sweep includes a metering image M1 captured using a TET of 2 milliseconds, a metering image M2 captured using a TET of 8 milliseconds, a metering image M3 captured using a TET of 32 milliseconds, a metering image M4 captured using a TET of 128 milliseconds, and a metering image M5 captured using a TET of 512 milliseconds. However, in some embodiments, more or fewer metering image captures may be in a sweep, and different TETs may be used to capture metering images. Also, in some embodiments, the TET values used for the metering image captures may change in some sweeps.

The preview image captures may include images that are captured for purposes of display on a viewfinder of an image capture device. However, this does not mean that preview images cannot be used for other purposes as well. In FIG. 4, preview image captures P1, P2, P3, P4, P5 are one-by-one interleaved with metering image captures M1, M2, M3, M4, M5. Nonetheless, other orderings are possible. For instance, two-by-one interleaves (two metering image captures followed by a single preview image capture, or a single metering image capture followed by two preview image captures) or other interleaves may be possible.

The TETs of the preview images may vary. For instance, they may vary based on the features of one or more previously-captured metering images. In this way, characteristics of the metering images, such as the TETs used to capture the metering images and the color and/or brightness values of pixels in the metering images, may be used to derive TETs to use when capturing preview images.

Furthermore, a possible benefit of logically separating metering image captures from preview and/or display image captures is that the metering captures can capture information from a scene beyond that of a single typical LDR exposure. Thus, the image capture device may be able to process these metering images to discover details, revealed by various exposures, that may be useful when constructing HDR images. For example, the image capture device may examine an over-exposed portion of a scene to determine whether the details therein are worth representing in an HDR image (e.g., if there is a face that has been "lost" due to this over-exposure). Another benefit of this logical separation may be to determine a sufficient (perhaps optimal) number of different TETs to use when capturing a scene. Moreover, the logical separation may provide superior results to a typical iterative viewfinder, which might only track a single TET hypothesis at a time. In contrast, the embodiments herein may permit testing multiple TET hypotheses and selecting any of these TETs.

As an example of the overall process, preview image capture P1 of sweep 1 may use a TET based on the TET and features of the image captured for metering image capture M1 of sweep 1. Similarly, preview image capture P2 of sweep 1 may use a TET based on the TETs and features of the images captured for metering image captures M1 and M2 of sweep 1. Likewise, preview image capture P3 of sweep 1 may use a TET based on the TETs and features of the images captured for metering image captures M1, M2, and M3 of sweep 1. In some cases, a preview image capture might not be based on the most recent one or more metering images due to those metering images still being processed by the image capture device. Thus, for example, preview image capture P3 of sweep 1 may use a TET based on the TETs and features of the images captured for just metering image capture M1 or just metering image captures M1 and M2 of sweep 1.

In general, the TET used to capture a preview image may be based on any number of previously-captured metering images. For instance, the TET used for preview image capture P5 of sweep 3 may be based on the TETs and/or features of all metering images captured in sweeps 1, 2, and/or 3, or any subset thereof. Additionally, the TET used for a preview image may also be based on information in training image database 304.

The TET used for a particular preview image capture may be derived based on any one or more of the techniques discussed in the context of FIGS. 1-3. Thus, the TET may be based on AE procedures where a target average pixel value for some or all of the scene's pixels is determined. If the actual average pixel value of a captured preview image is above the target average pixel value, the TET used in a subsequent preview image capture (e.g., the next preview image capture) may be decreased. Or, if the actual average pixel value of the captured preview image is below the target average pixel value, the TET used in a subsequent preview image capture may be increased. In this way, as long as the brightness of the scene is relatively static, the TETs used for preview image captures should converge to a single value or a limited range of values. Alternatively or additionally, the TET value may be based on information in a training image database.

As an example, FIG. 4 depicts the TETs used to capture preview images in sweep 1 converging to a value of 48 milliseconds. The TET used with preview image capture P1 is 100 milliseconds. Perhaps based on the TETs of metering image captures M1 and M2 and/or characteristics of the associated captured metering images, the TET used with preview image capture P2 is 70 milliseconds. Likewise, the TET used with preview image capture P3 is 50 milliseconds, while the TETs used with preview image captures P4 and P5 are both 48 milliseconds. This may indicate that the AE process has converged and that the brightness of the scene is relatively static.

The TETs used with preview images P1, P2, and P3 of sweep 2 are also 48 milliseconds, which again may indicate that the brightness of the scene has remained relatively static up to this point. Then, the TET used with preview images P4 is 82 milliseconds, and the TETs used with the remaining preview images in sweeps 2 and 3 are all 126 milliseconds. This may indicate that the brightness of the scene has decreased. For instance, the scene itself may have become less bright, or the image capture device may have moved so that it is directed to a darker portion of the scene.

Regardless, the TETs used to capture preview images may continue to adapt to the characteristics of the scene, and may do so based on information related to previously-captured metering images. Ideally, this adaptation results in the viewfinder of the image capture device displaying a preview image that is a reasonably accurate representation of a payload image that would be generated if the shutter function were triggered at that time.

Thus, for instance, if the shutter function is triggered after the image capture device displays the preview image that results from preview image capture P4 of sweep 1, the image capture device may capture a payload burst of images, in accordance with second image capture 314. In some embodiments, each of these payload images may be captured using the same or a similar TET. Alternatively, a single image may be captured, or a series of payload images may be captured using different respective TETs. After possible aligning and/or combining of these payload images, perhaps in accordance with step 316 of FIG. 3, an output image may be produced for further manipulation and/or longer term storage.

By following the procedures discussed herein, this output image should resemble at least some of the most recently displayed preview images. In some embodiments, the output image may be a single image capture determined to be the best, or at least a reasonably good, representation of the scene, even if the scene is HDR. In this way, the user of an image capture device may be provided with an output image that, based on the most recently displayed preview images, meets his or her expectations of how the output image should appear.

The image capture sweeps depicted in FIG. 4 are based on an implicit assumption that the scene type is LDR. While an HDR scene with a limited dynamic range may be reasonably well previewed by the techniques discussed in the context of FIG. 4, HDR scenes with broader dynamic ranges may be more difficult to preview with a single captured image. FIG. 5 provides an alternative set of image capture sweeps that may be used to provide a reasonably accurate preview of an HDR scene.

FIG. 5 depicts three image sweeps, sweep 4, sweep 5, and sweep 6. (These sweeps numbered differently to distinguish them from the sweeps of FIG. 4—however, no ordering between the sweeps of FIG. 4 and the sweeps of FIG. 5 is implied.) For each of these sweeps, a series of metering images, short TET preview images, and long TET preview images are captured. For instance, in sweep 4, metering image capture M1 uses a TET of 2 milliseconds, short TET preview image capture S1 uses a TET of 4 milliseconds, long TET image capture L1 uses a TET of 100 milliseconds, metering image capture M2 uses a TET of 8 milliseconds, short TET preview image capture S1 uses a TET of 12 milliseconds, long TET image capture L1 uses a TET of 130 milliseconds, and so on.

Like in FIG. 4, the TETs used for respective meter image captures for each sweep repeats. Thus, each sweep includes a metering image M1 captured using a TET of 2 milliseconds, a metering image M2 captured using a TET of 8 milliseconds, a metering image M3 captured using a TET of 32 milliseconds, a metering image M4 captured using a TET of 128 milliseconds, and a metering image M5 captured using a TET of 512 milliseconds. However, in some embodiments, more or fewer metering image captures may be in a sweep, and different TETs may be used to capture metering images. Also, in some embodiments, the TET values used for the metering image captures may change in some sweeps.

In FIG. 5, short TET preview image captures S1, S2, S3, S4, S5 and long TET preview image captures L1, L2, L3, L4, L5 are one-by-one-by-one interleaved with metering image captures M1, M2, M3, M4, M5. Nonetheless, other orderings and types of interleaves are possible.

As was the case for FIG. 4, the TETs of the short TET and long TET preview images may vary. For instance, they may vary based on the features of one or more previously-captured metering images, and/or information from training image database 304. In this way, information in metering images, such as the TETs used to capture the metering images and the color and/or brightness characteristics of pixels in the metering images, may be used to derive TETs to use when capturing preview images.

As an example, preview image captures S1 and L1 of sweep 4 may use TETs based on the TET and features of the image captured for metering image capture M1 of sweep 4. Similarly, preview image captures S2 and L2 of sweep 4 may use TETs based on the TETs and features of the images captured for metering image captures M1 and M2 of sweep 4. In general, the TET used to capture a short TET or long TET preview image may be based on any number of previously-captured metering images. As noted above, sometimes a preview image capture might not be based on the most recent one or more metering images due to those metering images still being processed by the image capture device.

As the sweeps progress, the image capture device may calculate, either continuously or from time to time, a low target average pixel value and a high target average pixel value for the scene. A short TET value to use in one or more subsequent preview image captures may be determined based on the low target average pixel value. Likewise, a long TET value to use in one or more subsequent preview image captures may be determined based on the high target average pixel value.

Additionally, the TETs used to capture preview images may adapt to the characteristics of the scene, and may do so based on information related to previously-captured metering images. This adaptation may be similar to the adaptation discussed in the context of FIG. 4, except that the short TET values and the long TET values may be adapted independently from one another.

When displaying a preview image on the viewfinder of the image capture device, one or more of the recently-captured short TET and long TET preview images may be aligned and combined, as discussed in the context of step 316 of FIG. 3. Thus, the displayed preview image may be constructed to properly expose details in both the light and dark sections of an HDR scene by using information from both short TET and long TET preview images. Ideally, this results in the displayed preview image being a reasonably accurate representation of a payload image that would be generated if the shutter function were triggered at that time.

Thus, for instance, suppose that the shutter function is triggered after the image capture device displays the preview image that results from short TET preview image capture S5 and long TET image capture L5 of sweep 4. In response to the shutter function being triggered, the image capture device may capture a payload burst of images, in accordance with second image capture 314. In some embodiments, each of these payload images may be captured using either a short TET value, a long TET value, or possible other TET values as well. After possible aligning and/or combining of these payload images, perhaps in accordance with step 316 of FIG. 3, an output image may be produced for further manipulation and/or longer term storage. By following the procedures discussed herein, this output image should resemble at least some of the most recently displayed preview images.

Alternatively, the image capture device could operate according to ZSL (zero shutter lag) or NSL (negative shutter lag) techniques. In these cases, upon triggering of the shutter function, instead of capturing a new image, the image capture device may refer to a cyclical buffer holding the most recent N images that were captured. The image capture device may then use one or more of the buffered images as the captured images. ZSL and NSL techniques help compensate for shutter function latency. Thus, for the embodiments herein, triggering the shutter function may result in capturing new images, or, if previously-captured images are in memory, using those instead.

Despite FIGS. 4 and 5 showing the TETs for the various types of preview images changing within a sweep, in some embodiments, these TETs may be static within a sweep and only change between sweeps. The scene type may be determined based on the dynamic range of the scene as determined by the metering sweep, and/or information in training image database 304.

Additionally, the scene type may be reclassified during and/or at the end of a sweep. Thus, for instance, if the scene type is classified as LDR, the sweeps like those depicted in FIG. 4 may be used. However, if the scene type changes to be classified as HDR, the image capture device may switch to using sweeps like those depicted in FIG. 5. Similarly, if the scene type changes back to being classified as LDR, the image capture device may switch back to using sweeps like those depicted in FIG. 4. Alternatively, some embodiments may only use the LDR sweeps of FIG. 4 regardless of scene type.

Figure 6:
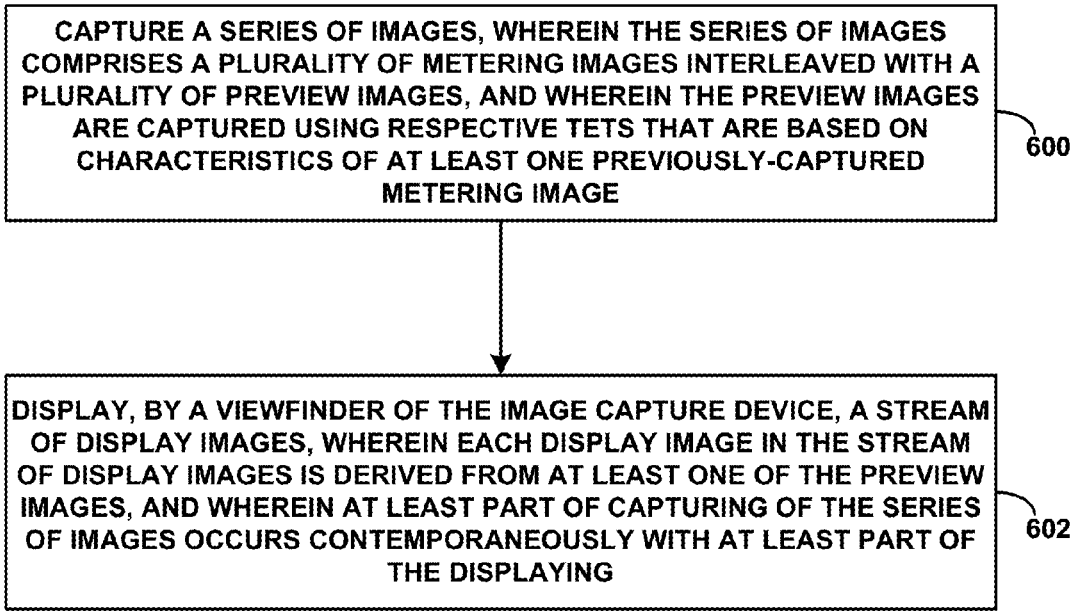
FIG. 6 depicts another flow chart, in accordance with an example embodiment.

FIG. 6 depicts a flow chart, in accordance with an example embodiment. At step 600, an image capture device may capture a series of images. The series of images may include a plurality of metering images interleaved with a plurality of preview images. The preview images may be captured using respective TETs that are based on characteristics of at least one previously-captured metering image. The metering images may be interleaved one-by-one with the preview images, or capture of the metering and preview images may be arranged in some other fashion.

At step 602, a viewfinder of the image capture device may display a stream of display images. Each display image in the stream of display images may be derived from at least one of the preview images. At least part of capturing of the series of images may occur contemporaneously with at least part of the displaying. Herein, "contemporaneously" may imply that the capturing and displaying take place at the same time, about the same time, or overlap in time to some extent.

The plurality of preview images may include one type of preview image, and each display image may be derived from a single type of preview image. Alternatively, the plurality of preview images may include two types of preview images, and each display image may be derived from at least one preview image of each type. In some embodiments, each type of the two types of preview images may be captured using a different TET.

Alternatively or additionally, one type of preview image may be a short exposure preview image that is captured using a short TET, and the other type of preview image may be a long exposure preview image that is captured using a long TET. The long TET may be greater than the short TET. The metering images, the short exposure preview images and the long exposure preview images may be interleaved one-by-one-by-one.

In some embodiments, the triggering of a shutter function of the image capture device may be detected. Perhaps responsively, the image capture device may capture a second series of images. Images in the second series may be captured using respective TETs that are based on characteristics of at least one previously-captured metering image. An output image that is based on at least one of the images in the second series may be stored.

Figure 7:
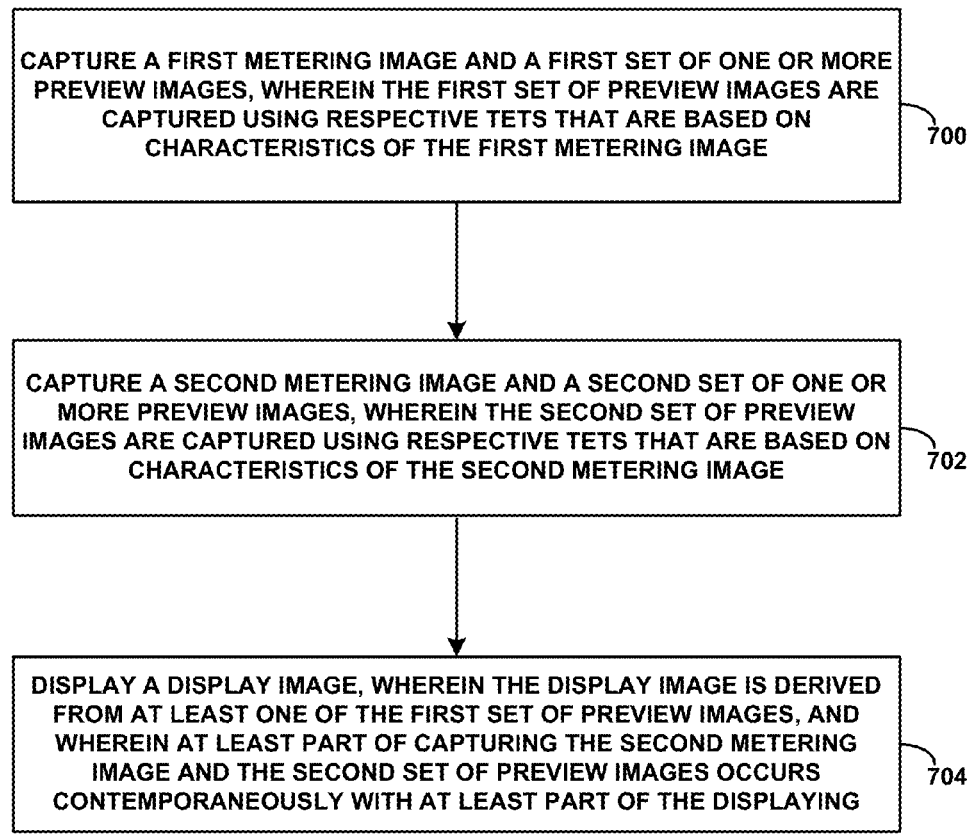
FIG. 7 depicts yet another flow chart, in accordance with an example embodiment.

FIG. 7 depicts a flow chart, in accordance with another example embodiment. At step 700, an image capture device may capture a first metering image and a first set of one or more preview images. The first set of preview images may be captured using respective TETs that are based on characteristics of the first metering image.

At step 702, the image capture device may capture a second metering image and a second set of one or more preview images. The second set of preview images may be captured using respective TETs that are based on characteristics of the second metering image.

At step 704, a viewfinder of the image capture device may display a display image. The display image may be derived from at least one of the first set of preview images. At least part of capturing the second metering image and the second set of preview images may occur contemporaneously with at least part of the displaying. In some cases, the display image may also or instead be based on one or more of the first set of metering images.

The first set of preview images may consist of two types of preview images, and the display image may be derived from at least one preview image of each type. Each type of the two types of preview images may be captured using a different TET. Alternatively or additionally, one type of preview image may be a short exposure preview image that is captured using a short TET, and the other type of preview image may be a long exposure preview image that is captured using a long TET. The long TET may be greater than the short TET. In some embodiments, more than just two TET lengths may be used. For instance, images may be captured using a short TET, a medium TET, and a long TET.

The steps depicted in FIG. 6 and/or FIG. 7 may be carried out by a camera device, such as digital camera device 100, a computing device, such as computing device 200, and/or by two or more distinct devices. Further, the flow charts depicted in these figures may be modified according to the variations disclosed in this specification and/or the accompanying drawings. For instance, the embodiments depicted by FIGS. 6 and 7 may be combined in various ways with one another and/or with other features described herein.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
capturing, by an image capture device, a series of images, wherein the series of images comprises a plurality of metering images interleaved with a plurality of preview images, and wherein the preview images are captured using respective total exposure times (TETs) that are based on characteristics of at least one previously-captured metering image;
displaying, by a viewfinder of the image capture device, a stream of display images, wherein each display image in the stream of display images is derived from at least one of the preview images, and wherein at least part of the capturing of the series of images occurs contemporaneously with at least part of the displaying;
detecting that a shutter function of the image capture device has been triggered;
capturing a second series of images, wherein images in the second series are captured using respective TETs that are based on characteristics of at least one previously-captured metering image; and
storing an output image that is based on at least one of the images in the second series.

2. The method of claim 1, wherein the metering images are interleaved one-by-one with the preview images.

3. The method of claim 1, wherein the plurality of preview images are captured using a first TET, and wherein each display image is derived from one of the plurality of preview images.

4. The method of claim 1, wherein each of the plurality of preview images are captured with either a first TET or a second TET, and wherein each display image is derived from at least one preview image captured with the first TET and at least one preview image captured with the second TET.

5. The method of claim 4, wherein the second TET is greater than the first TET.

6. The method of claim 5, wherein the metering images, the preview images captured using the first TET, and the preview images captured using the second TET are interleaved one-by-one-by-one.

7. An article of manufacture including a non-transitory computer-readable medium, having stored thereon program instructions that, upon execution by a computing device, cause the computing device to perform operations comprising:
capturing a series of images, wherein the series of images comprises a plurality of metering images interleaved with a plurality of preview images, and wherein the preview images are captured using respective total exposure times (TETs) that are based on characteristics of at least one previously-captured metering image;
displaying a stream of display images, wherein each display image in the stream of display images is derived from at least one of the preview images, and wherein at least part of the capturing occurs contemporaneously with at least part of the displaying;
detecting that a shutter function of the computing device has been triggered;
capturing a second series of images, wherein images in the second series are captured using respective TETs that are based on characteristics of at least one previously-captured metering image; and
storing an output image that is based on at least one of the images in the second series.

8. The article of manufacture of claim 7, wherein the metering images are interleaved one-by-one with the preview images.

9. The article of manufacture of claim 7, wherein the plurality of preview images are captured using a first TET, and wherein each display image is derived from one of the plurality of preview images.

10. The article of manufacture of claim 7, wherein each of the plurality of preview images are captured with either a first TET or a second TET, and wherein each display image is derived from at least one preview image captured with the first TET and at least one preview image captured with the second TET.

11. The article of manufacture of claim 10, wherein the second TET is greater than the first TET.

12. The article of manufacture of claim 11, wherein the metering images, the preview images captured using the first TET, and the preview images captured using the second TET are interleaved one-by-one-by-one.

13. A method comprising:
capturing, by an image capture device, a first metering image and a first set of one or more preview images, wherein the first set of preview images are captured using respective total exposure times (TETs) that are based on characteristics of the first metering image;
capturing, by the image capture device, a second metering image and a second set of one or more preview images, wherein the second set of preview images are captured using respective TETs that are based on characteristics of the second metering image; and
displaying, by a viewfinder of the image capture device, a display image, wherein the display image is derived from at least one of the first set of preview images, and wherein at least part of capturing the second metering image and the second set of preview images occurs contemporaneously with at least part of the displaying.

14. The method of claim 13, wherein the first set of preview images consists of two types of preview images, each type of the two types of preview images captured using a different TET, and wherein the display image is derived from at least one preview image of each type.

15. The method of claim 14, wherein one type of preview image is a short exposure preview image that is captured using a short TET, and wherein the other type of preview image is a long exposure preview image that is captured using a long TET, wherein the long TET is greater than the short TET.

* * * * *